United States Patent [19]

Nondahl

[11] 4,405,873

[45] Sep. 20, 1983

[54] ROTOR FOR A LINE-START PERMANENT-MAGNET MOTOR

[75] Inventor: Thomas A. Nondahl, Milwaukee, Wis.

[73] Assignee: General Electric Company, Schenectady, N.Y.

[21] Appl. No.: 314,617

[22] Filed: Oct. 26, 1981

[51] Int. Cl.³ .............................................. H02K 21/12
[52] U.S. Cl. ..................................... 310/156; 310/163
[58] Field of Search ............................... 310/162–165, 310/156

[56] References Cited

U.S. PATENT DOCUMENTS 3,164,735  1/1965  Lichowsky .......................... 310/156
3,181,019  4/1965  Pfister et al. ......................... 310/156

Primary Examiner—Donovan F. Duggan
Attorney, Agent, or Firm—William H. Steinberg; James C. Davis, Jr.; Marvin Snyder

[57] ABSTRACT

A rotor for a permanent magnet motor of the interior or embedded magnet type employs permanent magnet material in slots of two different widths in the rotor to bring the motor up to synchronous speed through hysteresis loss. During rotor rotation, the permanent magnet material in the thinner slots is driven completely about its hysteresis loop while the material in the wider slots experiences no polarity reversals.

10 Claims, 1 Drawing Figure

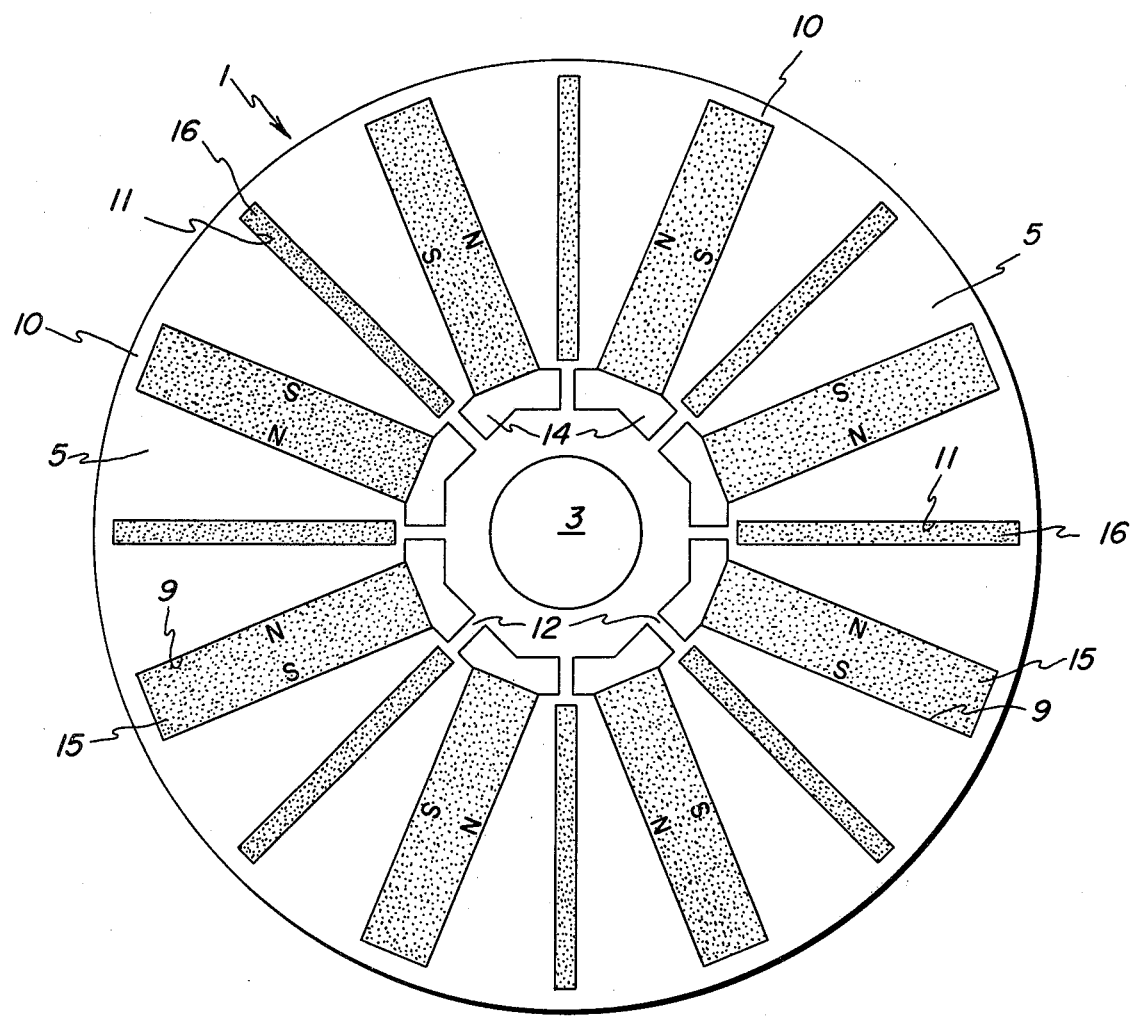

ROTOR FOR A LINE-START PERMANENT-MAGNET MOTOR

BACKGROUND OF THE INVENTION

This invention relates to permanent magnet motors of the interior or embedded magnet type.

Permanent magnet motors have good operating characteristics at synchronous speed, but the induction cages used to start them require large starting currents and give highly variable starting torques. The high starting currents for the induction starts undesirably tend to demagnetize the permanent magnet material, a particular problem for ferrite magnets. Demagnetization renders the motor inoperative as a synchronous motor. Another problem is that since the induction torque is zero at synchronous speed, the permanent magnet rotor does not always pull into synchronism especially with a high inertia load. Failure to pull into synchronism causes overheating and the motor does not run as a synchronous motor.

It is an object of the present invention to provide a permanent magnet motor having uniform average or net starting torque.

It is a further object of the present invention to provide a permanent magnet motor with a starting current no larger than the pull-out current of the motor when it is operating in synchronism.

It is a still further object of the present invention to provide a permanent magnet motor that can pull into synchronism large inertia loads.

SUMMARY OF THE INVENTION

In one embodiment a rotor for a permanent magnet motor has a cylindrical steel matrix made of flux conducting material with a shaft extending through an aperture extending along the axis of the cylinder. The cylindrical matrix has slots with a first width extending axially through the matrix and radially spaced about the axis of the matrix. Slots with a second width are positioned between each pair of circumferentially-successive slots of a first width. Permanent magnet material is situated in the slots with the magnet material in the slots of the first width being polarized so that circumferentially-successive faces of the magnets in the slots of the first width are of like polarity. The width of the permanent magnet material in the slots of the second width is sufficiently narrow to cause the magnetic material on these slots to be driven completely about its hysteresis loop when the rotor is at asynchronous speed in a rotating magnetic field. The permanent magnet material in the slots of the second width is sufficiently wide to retain its polarity and not be demagnetized. When the rotor is in the rotating magnetic field, permanent magnet material in the slots of the second width provides constant hysteresis torque from zero speed up to synchronous speed. The magnetic material in the slots of the second width, when the rotor is in the rotating magnetic field, results in operation as a permanent magnet motor at synchronous speed. The current drawn by a motor having the rotor just described will be constant from zero to synchronous speed when hysteresis torque is provided and the permanent magnet material of the slots of the first width will not be demagnetized at any speed.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

The FIGURE is an end view of a rotor for a permanent magnet motor in one embodiment of the present invention.

DETAILED DESCRIPTION OF THE PREFERRED EMBODIMENT

Referring to the FIGURE a self-starting permanent magnet rotor 1 is shown. A shaft 3 is positioned in an aperture which passes through the axis of a cylindrical steel matrix 5. The cylindrical steel matrix, which can be built up of laminated disks, has alternating slots 9 and 11 exhibiting a first and second width, respectively. In the embodiment shown, the first and second widths are wide and narrow, respectively, and uniformly extend axially through the cylindrical steel matrix. Slots 9 and 11 are radially spaced about the axis of the cylinder, and extend close to the periphery of the cylinder adjacent to a saturable bridge 10. Magnets 15 and 16 situated in slots 9 and 11, respectively, and are close together at the ends nearest to the axis, being separated from each other by saturable bridges 12. These magnets are comprised of permanent magnet material which can be ferrite magnets such as Indox 7 manufactured by Indiana General or manganese aluminum carbon magnets, for example, and are situated in the narrow and wide slots. Indox 7 has a relative magnetic permeability close to unity and a resistivity $10^8$ times that of copper. Thus, it has essentially no induced eddy currents and a reluctance comparable to air. Alternatively, manganese aluminum carbon magnets may be used. The magnets in the wide slots form an eight pole permanent magnet rotor as illustrated in the FIGURE, although configurations with different numbers of poles are possible. The permanent magnet material used in the wide and narrow slots does not have to be of the same type, although in the preferred embodiment it is. The width of the narrow slots 11 in the illustrated embodiment is approximately one-quarter the width of the wide slots 9. The relative widths of the slots are chosen so that when the rotor is operated in a rotating magnetic field which can be produced by a conventional polyphase excited stator (not shown) the magnetic material in the narrow slots will be driven completely about its hysteresis loop while the rotor runs at asynchronous speed and the magnetic material in the wider slots will remain polarized in its original orientation at all speeds. The positions of the slots near the periphery and the close proximity to each other of the slots near the ends closest to the axis of the matrix limits the leakage flux between poles of the same magnet by causing saturation of saturable bridges 10 and 12. The cylindrical matrix with the magnets inserted in the matrix can be cast in aluminum or epoxy, with casting materials filling any voids around the magnets 15 and 16.

Though the slots 11 have been shown positioned radially about the center of the cylinder, they can be positioned between the slots 9 in different orientations such as perpendicular to their present position as long as the width of the slot is such that the magnetic material in it will be driven about its hysteresis loop.

Some permanent magnet rotors employ "breaker slots" between adjacent magnets to control the flux paths in the rotor. Breaker slots are slots extending axially between the magnets. Thus laminations or a solid core design with breaker slots would not require additional etching or punching. The hysteresis material (permanent magnet material) could just be inserted in the existing breaker slots. The hysteresis material placed in the breaker slots does not appreciably change the air gap length across the breaker slots seen by the flux from the permanent magnets in the wide slots.

Thus, a motor with hysteresis start-up of the type shown in the FIGURE is capable of synchronizing a load torque greater than the full load torque of the motor without a large starting current. Also, because the average or net hysteresis torque is uniform over the speed range, high inertia loads can be started and run up to synchronous speed. A nonuniform average or net magnetic rotating field would reduce the starting torque since hysteresis torque which is generated during asynchronous operation by sequentially magnetizing and demagnetizing the hysteresis material is sensitive to the quality of the rotating magnetic field.

The motor achieves a higher efficiency than a conventional hysteresis-start, hysteresis-run motor by having the motor operate as a permanent magnet motor at synchronous speed.

While the present invention has been described with reference to a specific embodiment thereof, it will be obvious to those skilled in the art that the various changes and modifications can be made without departing from the inventions broader aspects.

What is claimed is:

1. A rotor for a self-starting permanent magnet motor comprising:
    a shaft;
    a cylindrical steel matrix having an aperture extending through the cylinder along its axis for mounting on said shaft, said matrix having a plurality of slots of a first width extending axially through said matrix and radially spaced about the axis of said matrix, said matrix having a slot of a second width between each pair of circumferentially-successive slots of said first width, said slots of a second width extending axially through said matrix; and
    permanent magnet material positioned in said slots, said material in said slots of a first width polarized so that circumferentially-successive faces of said material in said slots of a first width have like polarity, said magnet material in said slots of a second width being sufficiently narrow to be driven completely about its hysterisis loop when said rotor is subjected to a rotating magnetic field in said motor and said rotor is rotating at below synchronous speed, said magnetic material in said slots of a first width being sufficiently wide to retain its polarity when said rotor is subjected to a rotating magnetic field in said motor.

2. The rotor of claim 1 wherein said slots of a second width in said matrix are radially spaced about said cylindrical steel matrix axis.

3. The rotor of claim 1 wherein the permanent magnet material in said slots of the first width differs from the permanent magnet material in said slots of the second width.

4. A rotor for a self-starting permanent magnet motor comprising:
    a shaft;
    a cylindrical steel matrix having an aperture extending through the cylinder along its axis for mounting on said shaft, said matrix having a plurality of wide slots extending axially through said matrix and radially spaced about the axis of said matrix, said matrix further having a narrow slot between each circumferentially-successive pair of said wide slots, said narrow slots extending axially through said matrix; and
    permanent magnet material positioned in said wide and narrow slots, said material in said wide slots polarized so that circumferentially-successive faces of said material in said wide slots have like polarity, said magnet material in said narrow slots being sufficiently narrow to be driven completely about its hysteresis loop when said rotor is subjected to a rotating magnetic field in said motor and said rotor is rotating at below synchronous speed, said magnetic material in said wide slots being of sufficient width to retain its polarity when said rotor is subjected to a rotating magnetic field in said motor.

5. The rotor of claims 1 or 4 wherein said cylindrical steel matrix comprises a plurality of thin steel disks.

6. The rotor of claim 4 wherein said narrow slots in said matrix are radially spaced about said cylindrical steel matrix axis.

7. The rotor of claim 4 wherein said permanent magnet material comprises ferrite.

8. The rotor of claim 7 wherein said narrow slot width is approximately one-quarter of said wide slot width.

9. The rotor of claim 1 wherein said permanent magnet material comprises manganese aluminum carbon magnets.

10. The rotor of claim 4 wherein the permanent magnetic material in the wide slots comprises a different permanent magnet material from that in the narrow slots.

* * * * *